Nov. 25, 1958     H. N. WEBSTER     2,861,846
SELF-ALIGNING BALANCE
Filed Aug. 21, 1952
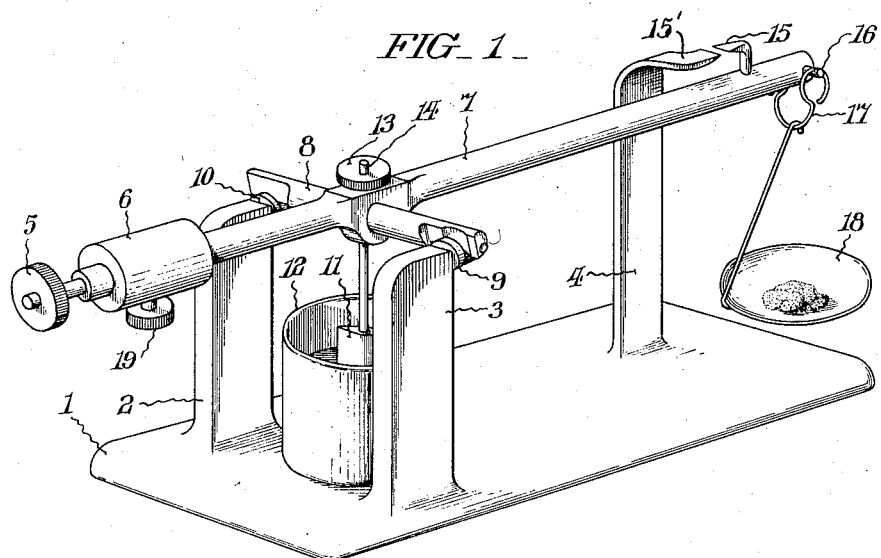
FIG_1_
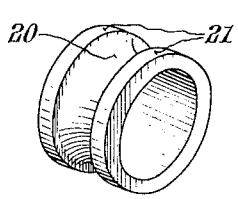
FIG_2_
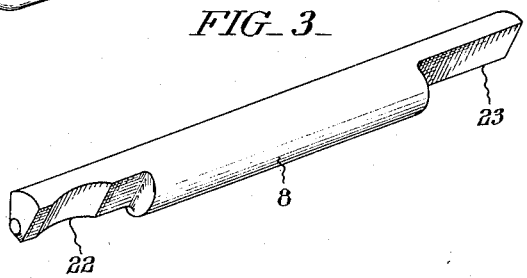
FIG_3_
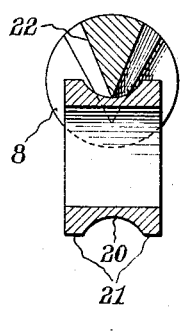
FIG_5_
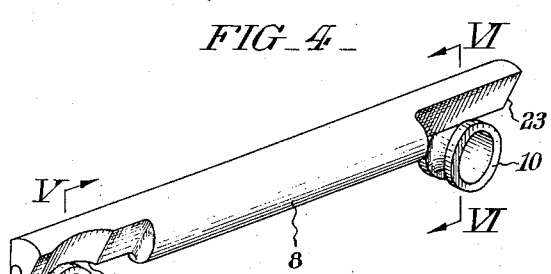
FIG_4_
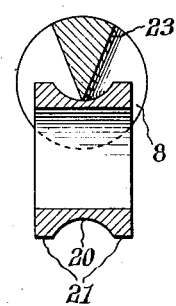
FIG_6_
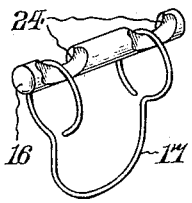
FIG_7_
INVENTOR.
Henry N. Webster,
BY Paul & Paul
ATTORNEYS.

United States Patent Office 2,861,846
Patented Nov. 25, 1958

2,861,846

SELF-ALIGNING BALANCE

Henry N. Webster, Sebring, Fla., assignor to Harry K. Swank, Sebring, Fla.

Application August 21, 1952, Serial No. 305,581

8 Claims. (Cl. 308—2)

This invention relates to a new, improved sensitive balance, and particularly for a balance of the type used in measuring powder charges for firearms.

Heretofore, balances have been devised which either restrict the lateral motion of the fluctuating balance beam by limiting the rotation of its pivot member and hence reducing its sensitivity, or which permit free fluctuation of the balance beam and thus greatly extend the time for measurement and allow lateral movement of the balance beam. The latter type, while producing less friction between the bearing parts, is unreliable since no limit is placed upon the position of the balance beam relative to the stationary parts of the balance.

It is the principal object of this invention to provide a self-aligning sensitive balance.

It is another object of this invention to provide a sensitive balance which will measure amounts to one-hundredth grain with a minimum of motion between the bearing parts, and with a minimum of friction.

A further object is to provide a sensitive balance in which free fluctuation of the balance beam is permitted without lateral movement with respect to the stationary parts.

A still further object is to provide a practical balance of simple construction which will measure to one-hundredth grain relatively rapidly.

The foregoing and other objects are attained by means of a movable knife-edge pivot member of unique design, one of the knife-edges being curved, and stationary bearings having arcuate surfaces of concave cross-section designed to cooperate with the movable pivot member.

Other objects and advantages of the present invention will be apparent from the accompanying drawings, in which:

Fig. 1 is a perspective view of a sensitive balance embodying all of the essential features of my invention.

Fig. 2 is a perspective view of one of the fixed bearings of the device shown in Fig. 1.

Fig. 3 is a perspective view of the pivot member having knife-edges at either end, one of which is curved, shown in Fig. 1.

Fig. 4 is a perspective view of fixed bearings as shown in Fig. 2, and a pivot member shown in Fig. 3, cooperatively mounted thereon, as shown in Fig. 1.

Fig. 5 is a sectional view taken on line V—V of Fig. 4.

Fig. 6 is a sectional view taken on line VI—VI of Fig. 4.

Fig. 7 is a perspective view of a hanger to hold the weighing tray and a bearing member therefore, as shown in Fig. 1.

The embodiment of the invention illustrated in the drawings is but one preferred embodiment thereof, which may be modified in many ways without departing from the scope of the invention.

Referring to Fig. 1 of the drawings, there is shown in perspective an assembled balance built upon a base plate 1. The bearing pedestals 2 and 3 are fixed to the base plate and each carries a fixed bearing, 9 and 10, respectively. Mounted upon the bearings 9 and 10 is the pivot member 8, which passes transversely through the balance beam 7. At one end of the balance beam 7, the weighing tray 18 is suspended from hanger 17, supported by bearing member 16. The balance indicator 15 is fixed to the balance beam 7 adjacent the indicator 15' extended from pedestal 4. At the other end of the balance beam 7 are the movable weights 5 and 6. Weight 6 is slidably mounted and held in position by set screw 19, and weight 5 is threaded and may be moved by rotation. The damper 11 is suspended from the balance beam 7 at the pivot member 8 into the damper well 12. Weight 13 is threaded and mounted upon a projection 14 from the balance beam 7.

In operation, the balance is set by placing weights of the desired amount in the tray 18 and adjusting the weights 5 and 6 until the balance indicator 15 is aligned with the indicator 15' extended from pedestal 4. A rough balance may be achieved by weight 6, and a fine adjustment by weight 5. Upon removal of the weights the material to be weighed is then placed in the tray 18 in an amount sufficient to achieve alignment of the indicators 4 and 15. The momentum of the oscillating balance beam 7 developed by placing the material in the tray 18 is reduced by the damper 11 in the damper well 12. The degree of damping may be increased by increasing the viscosity of the fluid in the damper well 12. The sensitivity of the balance may be increased by moving the weight 13 out along the projection 14, and the length of time necessary to effect the weighing will be correspondingly increased.

The pivot assembly is shown in detail in Figs. 2–6. The arcuate concave surfaces 20 of the bearings 9 and 10 form grooves in which the knife-edges 22 and 23 of the pivot member 8 ride. The knife-edge 23 is straight, but knife-edge 22 is slightly curved to conform to the arcuate surface 20 of the bearing 9. Throughout, the bearing surface which is curved in a plane parallel to the bearing lines 22 and 23 is referred to as an arcuate surface. The curvature of the bearing surface 20 in planes perpendicular to the arcuate surface is described as concave cross section of the arcuate surface 20. The curve of knife-edge 22 maintains a limitation upon the lateral movement of the pivot member 8 on the bearings 9 and 10, thereby automatically aligning the balance beam 7. The shoulders 21 of the bearings 9 and 10 serve to limit the oscillations of the pivot member 8 and thus greatly reduce the time required for measurement.

The hanger assembly which holds the weighing tray 18, shown in Fig. 7, employs a bearing member 16 having two curved knife-edges 24, providing automatic alignment of the hanger 17.

The construction according to my invention provides a self-aligning balance with a minimum of friction between the bearing parts. The knife-edges of the pivot member 8 are in point contact with the bearings 9 and 10, but the curvature of knife-edge 22 maintains the constant alignment of the balance beam 7.

Although I have described in detail one embodiment of my invention, it will be apparent that the device is capable of a wide variety of applications and uses, and that certain features thereof may be used to advantage without the use of other features. It is to be understood that the specific devices referred to and claimed herein are intended to comprehend all mechanical equivalents and reversals of parts which function in a similar manner to accomplish a similar result.

Having thus described my invention, I claim:

1. A pivot assembly for a sensitive balance comprising fixed bearings, each of said bearings having an arcuate surface of concave cross-section and a movable pivot member having a curved knife-edge and a straight knife-edge, wherein each knife edge is mounted separately on a bearing.

2. A sensitive balance comprising fixed bearings, each of said bearings having an arcuate surface of concave cross section, a pivot member having knife edges mounted on said bearings, at least one of said knife edges being straight, a balance beam mounted on the pivot member, a damper well disposed beneath and between said bearings and a vertically adjustable damper paddle depending from said balance beam at the juncture with said pivot member and extending into said damper well.

3. A sensitive balance comprising fixed bearings, each of said bearings having an arcuate surface of concave cross section, a pivot member having knife edges mounted on said bearings, at least one of said knife edges being straight, a balance beam mounted on the pivot member, adjustable balance weights mounted on said balance beam, a damper well disposed beneath and between said bearings, a damper paddle affixed to said pivot member and extending into said damper well and means for vertically adjusting said damper paddle.

4. The apparatus set forth in claim 3 in which said means comprises a threaded rod attached to said damper paddle and a threaded nut attached to said rod.

5. A sensitive balance comprising fixed bearings, each of said bearings having an arcuate surface of concave cross-section, a pivot member having knife edges, at least one of said knife edges being curved, said knife edges mounted on said bearings and a balance beam mounted on the pivot member.

6. The apparatus set forth in claim 5 further comprising damping means adjustably mounted on said balance beam.

7. The apparatus set forth in claim 5 further comprising adjustable balance weights mounted on said balance beam.

8. The apparatus set forth in claim 5 further comprising adjustable balance weights and damping means mounted on said balance beam.

References Cited in the file of this patent

UNITED STATES PATENTS

| Number | Name | Date |
|---|---|---|
| 146,702 | Osgood | Jan. 20, 1874 |
| 216,514 | Farnum | June 17, 1879 |
| 241,363 | Hopkins | May 10, 1881 |
| 528,837 | Wheeler | Nov. 6, 1894 |
| 553,656 | McMaster | Jan. 28, 1896 |
| 561,470 | Anderson | June 2, 1896 |
| 1,000,935 | Otto | Aug. 15, 1911 |
| 1,032,439 | Templeton | July 16, 1912 |
| 1,067,341 | Hopkinson | July 15, 1913 |
| 1,302,884 | Varney | May 6, 1919 |
| 1,406,780 | Thompson | Feb. 14, 1922 |
| 1,482,222 | Dunoyer | Jan. 29, 1924 |
| 1,565,251 | Bousfield | Dec. 15, 1925 |
| 1,672,735 | Seederer | June 5, 1928 |
| 1,741,737 | Ring | Dec. 31, 1929 |
| 1,785,382 | Hurt | Dec. 16, 1930 |
| 1,928,930 | De Juhasz | Oct. 3, 1933 |
| 1,949,721 | Klopsteg | Mar. 6, 1934 |
| 2,006,255 | Best | June 25, 1935 |
| 2,191,635 | Battenberg | Feb. 27, 1940 |
| 2,256,318 | Hadley | Sept. 16, 1941 |
| 2,475,685 | Williams | July 12, 1949 |
| 2,612,415 | Williams | Sept. 30, 1952 |
| 2,622,868 | Yeasting | Dec. 23, 1952 |
| 2,622,938 | Van Duyn | Dec. 23, 1952 |

FOREIGN PATENTS

| 984,083 | France | Feb. 21, 1951 |